(12) United States Patent
DiSalvo et al.

(10) Patent No.: US 9,279,503 B2
(45) Date of Patent: Mar. 8, 2016

(54) CONSTANT VOLUME COMBUSTION CHAMBER

(75) Inventors: Roberto DiSalvo, Cincinnati, OH (US);
Stephen Doherty, New Hope, AL (US);
Alton J. Reich, Huntsville, AL (US)

(73) Assignee: Streamline Automation, LLC, Huntsville, AL (US)

( * ) Notice: Subject to any disclaimer, the term of this patent is extended or adjusted under 35 U.S.C. 154(b) by 816 days.

(21) Appl. No.: 13/452,167

(22) Filed: Apr. 20, 2012

(65) Prior Publication Data
US 2012/0317956 A1    Dec. 20, 2012

Related U.S. Application Data

(60) Provisional application No. 61/498,742, filed on Jun. 20, 2011.

(51) Int. Cl.
| | |
|---|---|
| F02K 9/86 | (2006.01) |
| F16K 1/38 | (2006.01) |
| F02K 9/52 | (2006.01) |
| F02K 9/58 | (2006.01) |
| F02K 9/62 | (2006.01) |
| F23C 3/00 | (2006.01) |
| F23R 7/00 | (2006.01) |
| F23C 99/00 | (2006.01) |

(52) U.S. Cl.
CPC . *F16K 1/385* (2013.01); *F02K 9/52* (2013.01); *F02K 9/58* (2013.01); *F02K 9/62* (2013.01); *F23C 3/00* (2013.01); *F23C 99/00* (2013.01); *F23R 7/00* (2013.01); *F23C 2900/03005* (2013.01)

(58) Field of Classification Search
CPC ............. F02K 9/86; F02K 9/52; F16K 1/385; F16K 1/38
USPC ......... 60/247, 39.38, 39.76, 249, 39.4, 39.78, 60/770, 771, 211, 258, 242; 251/122, 333
See application file for complete search history.

(56) References Cited

U.S. PATENT DOCUMENTS

| | | | | |
|---|---|---|---|---|
| 3,230,704 | A * | 1/1966 | Lovingham | 60/225 |
| 3,848,806 | A * | 11/1974 | Samuelsen et al. | 239/265.11 |
| 3,863,442 | A * | 2/1975 | Schmidt et al. | 60/258 |
| 4,478,040 | A * | 10/1984 | Johnson | 60/225 |
| 4,777,795 | A * | 10/1988 | Le Corre et al. | 60/234 |
| 4,948,360 | A * | 8/1990 | Wells | 431/1 |
| 5,394,690 | A | 3/1995 | Arszman et al. | |
| 6,519,928 | B2 * | 2/2003 | Munding et al. | 60/218 |
| 6,591,603 | B2 | 7/2003 | Dressler et al. | |
| 6,629,416 | B1 | 10/2003 | Johnson | |
| 7,137,612 | B2 * | 11/2006 | Baca | 251/122 |
| 7,565,797 | B2 | 7/2009 | Nyberg et al. | |
| 7,631,487 | B2 | 12/2009 | Di Salvo et al. | |
| 7,735,311 | B2 * | 6/2010 | Eidelman et al. | 60/247 |

(Continued)

*Primary Examiner* — Steven Sutherland
(74) *Attorney, Agent, or Firm* — Tomas Friend (57) ABSTRACT

A constant volume combustion chamber, combustor, and method for constant volume combustion involve combusting a fuel in a chamber sealed by a pintle having a conical portion fitted into a conical nozzle throat and pulling the pintle away from the nozzle throat to allow combustion products to exhaust through a nozzle outlet. The shapes and surfaces of the pintle and nozzle throat provide for sealing the chamber at high pressures while resisting surface wear. Operational parameters for the combustor may be computer controlled in response to measured pressures and temperatures in the combustor.

15 Claims, 6 Drawing Sheets

(56) References Cited

U.S. PATENT DOCUMENTS 7,913,973 B1 * 3/2011 Jansen et al. .................. 251/122

2007/0062176 A1 * 3/2007 Bendel ............................ 60/204
2008/0098711 A1 * 5/2008 DiSalvo et al. ................. 60/211
2009/0007540 A1 * 1/2009 Hansen ........................ 60/39.76

* cited by examiner

CONSTANT VOLUME COMBUSTION CHAMBER

RELATED APPLICATIONS

This application is a non-provisional of and claims priority to U.S. application Ser. No. 61/498,742, filed Jun. 20, 2011, which is incorporated by reference in its entirety.

FEDERALLY SPONSORED RESEARCH OR DEVELOPMENT

The U.S. Government has certain rights to this invention pursuant to Contract Number NNX10CE13P awarded by the National Aeronautics and Space Administration.

BACKGROUND OF THE INVENTION

1. Field of the Invention

The present invention relates to constant volume (CV) combustion chambers and combustors and methods for their operation.

2. Description of Related Art

Constant volume combustion is fundamentally different and operates on a different principle from constant pressure combustion. A constant pressure combustor uses an open combustion chamber and high pressure is maintained in the combustion chamber during combustion by supplying high-pressure fuel and oxidizer to the combustion chamber.

A pulse detonation combustor uses an open combustion chamber and mimics true constant volume combustion by combusting fuel so quickly that combustion is complete before combustion product exhaust exits the open combustion chamber. Fuel and oxidizer are injected into the combustion chamber in pulses, resulting in sequential detonations that create pressure pulses of exhaust from a nozzle. Unlike constant pressure or pulse detonation rocket motors, a constant volume engine employs an adiabatic isochoric deflagration process to achieve combustion of the fuel-oxidizer mixture. The combustion chamber is sealed during combustion and opened at an optimal time after combustion initiation to release combustion products through a nozzle to provide thrust.

Constant pressure combustors may experience reduced efficiency as ambient pressure changes, for example with altitude. Plugs or pintles have been used in combination with constant pressure combustors to overcome this limitation. For example, U.S. Pat. No. 5,394,690 discloses a pressure-controlled pintle to provide a constant pressure and variable thrust from an engine. In response to the pressure in the combustion chamber falling below a design pressure, the pintle closes a gap between the pintle and a nozzle throat to lower the area of the throat to re-establish design pressure in the chamber. U.S. Pat. No. 6,591,603 B2 discloses a rocket engine that is self-compensating on nozzle thrust coefficient for varying ambient backpressures. The rocket engine includes a nozzle plug that aerodynamically self-compensates for changes in ambient backpressure at the nozzle exit cone such that the nozzle thrust coefficient is maximized for any ambient backpressure. U.S. Pat. No. 7,656,979 B2 discloses varying the direction and magnitude of thrust from a solid or liquid fuel rocket motor by changing the relative positions of a plug and a combustion chamber outlet. The plug is moved to maintain efficient operation of the motor, for example, at different altitudes.

In these cases, the pintle or plug must never seal the combustion chamber because the fuel and oxidizer enter the combustion chamber at a near steady rate and blocking the exhaust during normal operation would result in an explosion.

Pulse detonation combustors suffer from drawbacks associated with structural requirements to prevent failure and the complexity of fuel delivery and ignition systems required to obtain properly timed detonations. One way of overcoming some of these drawbacks is described in U.S. Pat. No. 7,047,724 B2, which discloses a combustor comprising multiple, distributed ignition sources to obtain constant volume-like combustion performance in a pulse combustion device in the absence of detonation. The improvement mitigates some of the drawbacks associated with detonation-type combustion and resulting shock waves, but the ignition system of such a combustor remains relatively complex in order to obtain complete combustion during each pulse before combustion products escape the open end of the combustion chamber.

Advantages of the constant volume combustion cycle relative to pulse detonation combustors include simpler ignition systems and a reduction in the extremely high pressures. Advantages of the constant volume combustion cycle over conventional liquid bipropellant constant-pressure combustion cycles include the possible elimination of high-pressure pumps and improved Isp for a given system supply pressure. U.S. Pat. No. 7,631,487 B2, which is incorporated by reference in its entirety, discloses a constant volume rocket motor with a combustion chamber comprising a reciprocating thrust valve that controls the flow of combustion products through an outlet nozzle. The rocket motor comprises a combustor capable of producing pressure pulses of between 500 and 700 PSI. The reciprocating thrust valve seals against a nozzle seat on a wall of a combustion chamber. Wear of the thrust valve and the throat of the combustion chamber outlet is mitigated by a canted-coil on the pintle. A simple pintle without a canted coil is disclosed in the '487 patent in an example as being "non-optimal" because of expected wear that would prevent adequate sealing of the chamber.

The combustor of the constant volume rocket motor disclosed in the '487 patent is limited with respect to the need for a canted coil pintle to prevent wear on surfaces used to seal the combustion chamber and effectively sealing the combustion chamber during combustion at very high pressures, such as pressures above 700 PSI.

BRIEF SUMMARY OF THE INVENTION

Embodiments of the present invention preferably seek to mitigate, alleviate or eliminate one or more disadvantages or issues in the art such as the above-identified, singly or in any combination, by providing a combustor, system, a method, and a computer-readable medium that provide for improved operational performance relative to existing constant volume combustion chambers, including higher combustion chamber and pulse pressures, higher cycling rates, and greater reliability, according to the appended patent claims.

As used herein, the term "combustor" refers to a combustion chamber together with means for injecting fuel and oxidizer, means for ignition, and means for releasing exhaust from the chamber. The operation of a combustor, including control of injection, ignition, and exhaust release may be controlled by means of a central processing unit such as a computer and/or microprocessor electronically and/or wirelessly coupled to the combustor.

As used herein, combustion refers to an exothermic reaction of a fuel with an oxidizer to form combustion products. The fuel and oxidizer may require a source of ignition, such as a spark or laser, or the fuel and oxidizer may spontaneously react, as is the case with hypergolic bipropellants.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Advantages of the constant volume combustion cycle relative to pulse detonation combustors include simpler ignition systems and absence of extremely high pressures resulting from detonation. Advantages of the constant volume combustion cycle over conventional liquid bipropellant constant-pressure combustion cycles include lower pressure in the chamber during injection and improved Isp for a given system supply pressure.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DETAILED DESCRIPTION OF THE INVENTION

Specific embodiments of the invention are described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention.

The following description focuses on an embodiment of the present invention applicable to a constant volume (CV) combustion chamber and a CV combustor used for propulsion and in particular to a combustor comprising a single exhaust outlet, numbers of and locations for injection ports, sensors, actuators, ignition means, fuels, and oxidizers. However, it will be appreciated that the invention is not limited to the numbers and locations of the elements in the described embodiments but the numbers and locations of these elements may be altered and/or optimized by those skilled in the art for a variety of purposes. Furthermore, elements of the combustion chamber used to seal the chamber comprise an effective valve for controlling high velocity and/or high volume flows of fluids in addition to controlling the release of combustion products from the CV combustion chamber. For use in such applications, the combustion chamber acts a valve chamber that receives a fluid flow through an inlet rather than receiving propellant through one or more inlets.

Figure 1:
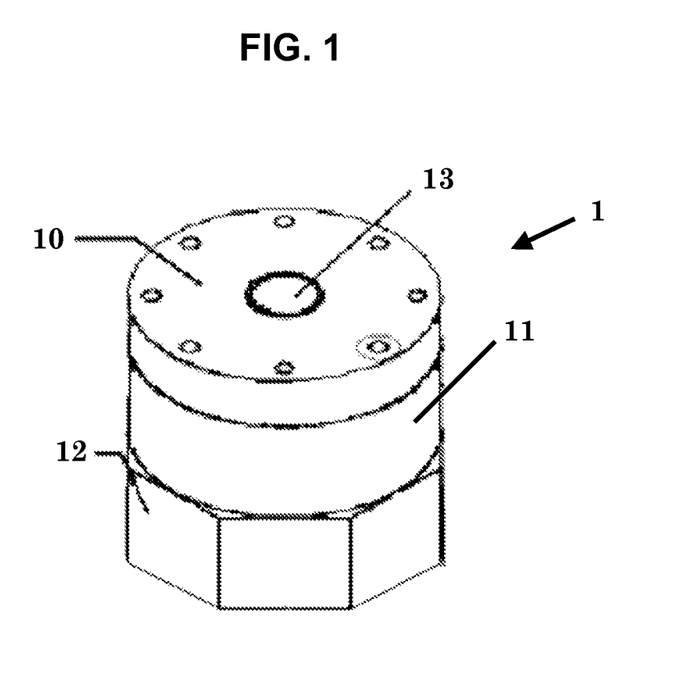
FIGS. 1 and 2 show isometric and cross-sectional views of an embodiment of a constant volume (CV) combustion chamber.
Figure 2:
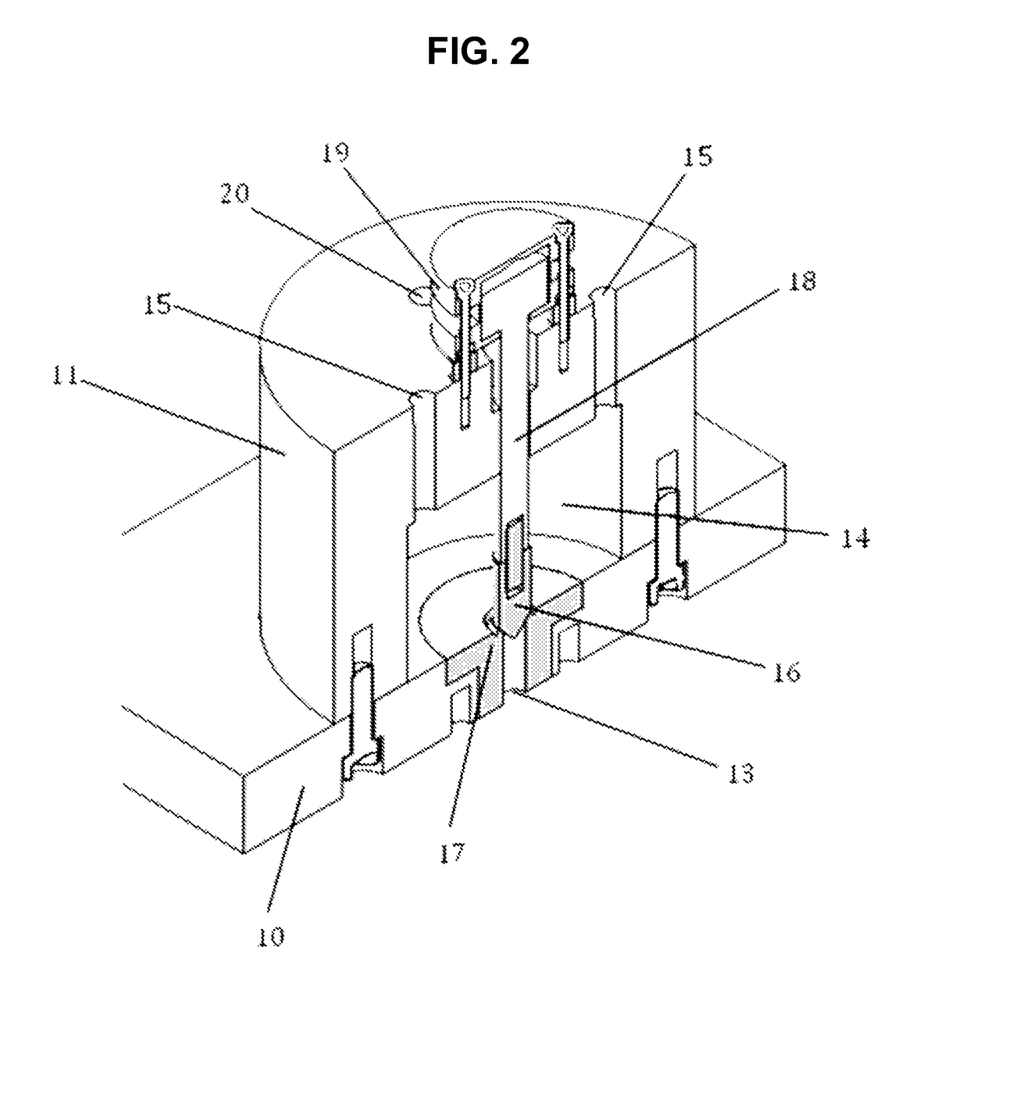

In some embodiments, a constant volume combustion chamber according to the present invention comprises separate injector-pintle 12, a combustion chamber 11, and nozzle 10 portions that are assembled to form the combustion chamber 1 (FIGS. 1 and 2). In other embodiments, two or more of these portions 10-12 may be combined to make a combustion chamber comprising two sections or the engine may be embodied as a single unit. The portions, sections, or single unit may be made of materials such as stainless steel, 304 stainless steel, tool steel, copper, titanium, aluminum, 6061-T6 aluminum, Inconel alloys, or niobium superalloys. A preferred niobium superalloy is C103, which consists of 89% niobium, 10% hafnium and 1% titanium. The CV combustor segments shown are of a cylindrical design, but may be of any desired shape. The nozzle section and can be varied in volume and geometry to accommodate different combustion chamber designs and shapes including cylindrical, toroidal, and spherical shapes. In some embodiments, a single combustion chamber may be outfitted with a plurality of nozzle sections, actuation means, and pintle heads for directional thrust control. For example, a combustor may comprise four outlet nozzles, four actuation means, and four pintle heads. The actuation means may be coupled to the pintle heads such that the mechanical couplings between actuation means and pintle heads do not interfere with one another. This can be accomplished by proper spatial arrangement of the components in the combustion chamber and/or selecting shapes (e.g. arcs) for mechanical couplings between actuation means and pintle heads. The outlet nozzles may, for example, be arranged on a spherical combustion chamber to face in the direction of each of four corners of a tetrahedron. Also a single nozzle may be connected to a plurality of combustion chambers.

Figure 3:
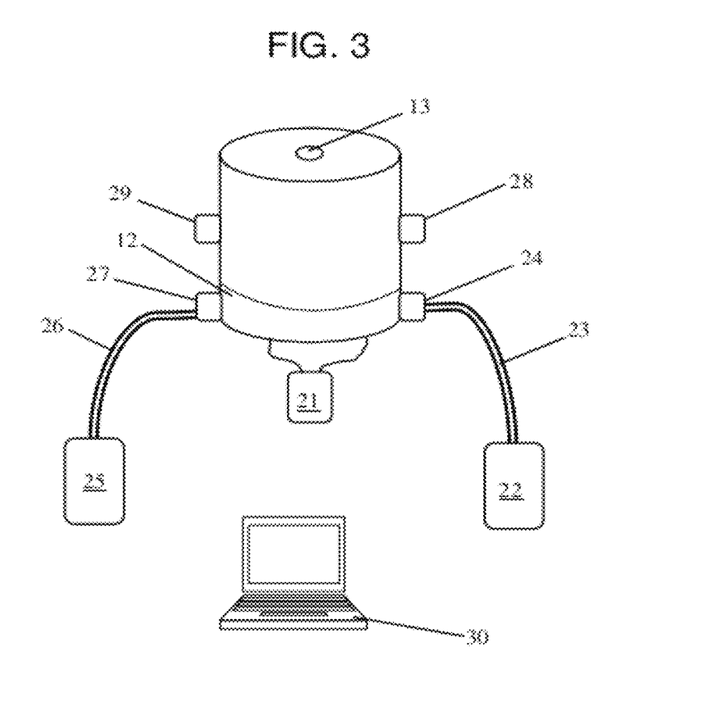
FIG. 3 is a schematic of an embodiment of a CV combustor.

The injector-pintle section 12 may comprise components necessary to inject a fuel/oxidizer combination and to actuate the valving and pintle required to achieve constant volume combustion. Injectors and valves may alternatively or additionally be incorporated in the combustion chamber section 11. In the embodiment shown in FIG. 2, the injector-pintle section comprises an actuator 19 for moving a pintle shaft 18 alternately toward and away from a nozzle outlet 13 in the nozzle section 10. The actuator 19 may be, for example, pneumatic, electric, hydraulic, or mechanical and may include a pressure balancing mechanism to reduce the actuation force. The pintle 19 is moved by a stroke or travel distance necessary to allow the correct flow area for the mass of propulsion gases contained in the volume of the combustion chamber 14. In some embodiments, the travel distance may be adjustable, for example by incorporating a cam on a rotatable pintle shaft with the pintle head traveling a distance determined by the location of the cam on the pintle shaft. A combustor having a configuration as shown in FIG. 3 was manufactured and used a stroke distance of 0.25 inches. Generally, the stroke distance is kept to a minimum required to allow desired flow characteristics while allowing fast recycling times. The pintle shaft is attached to a pintle head 16 that is configured to contact an impact seal 17 to seal the volume 14 of the combustion chamber when the actuator 19 moves the pintle shaft toward the impact seal 17. The combustion chamber section 11 comprises fuel/oxidizer ports 15 configured for attachment of fuel and oxidizer injectors, and igniter port 20 configured for attachment to an ignition source. The fixed volume 14 of the combustion chamber is formed by the inner surfaces of the combustion chamber section 11 and the nozzle section 10. The impact seal 17 of this embodiment is shown as a modular element that can be exchanged. A modular impact seal may be used with any of the alternative embodiments described herein or it may be an integral part of the chamber or the nozzle section. The injector-pintle and nozzle sections 12 and 13 are arranged on directly opposite sides of the combustion chamber section. The relative positions may be changed, for example by hinging the mechanical coupling between the actuator 19 and the pintle head 16. The injection ports 15, actuator 19, and/or the pintle shaft 18 may be moved to different positions from those shown so long as the pintle head 16 is able to move into and out of position within the valve seat 17 of the nozzle section to alternately open and seal the volume of the combustion chamber 14.

FIG. 3 shows a combustor system comprising a computer/microprocessor/CPU 30 that may be electrically and/or wirelessly connected to fuel and oxidizer valves on fuel and oxidizer injectors 24 and 27, pumps or valves on fuel and oxidizer tanks 22 and 25, pressure and temperature sensors 28 and 29, and the actuator. In a preferred embodiment, a computer/microprocessor/CPU 30 comprises a computer readable medium comprising a program for controlling the operation of the combustor, including a logic circuit that, in the event of a system failure, enters the combustor into a safe configuration. For example, if the pintle fails to open, the fuel and oxidizer valves close, and the igniter shuts off. The controlled/actuated components including fuel and oxidizer solenoids and valves, and the pintle actuator, are attached to the injector and pintle section 12. The combustor may comprise, for example, four injector doublets and fully redundant fuel and oxidizer systems coupled to the section. The four fuel and four oxidizer injector valves may be, but need not be, arranged in pairs. Passive valving devices, such as reed-type valves, may be installed at the injector face to keep propellant dribble volumes full during sustained operation to improve response characteristics. This also enables the decoupling of the propellant flow control valves from the chamber to mitigate problems associated with high heat soak-back during operation. Two fuel and two oxidizer manifolds may be located on or near the combustion chamber. Each manifold can be configured to feed two valves and each manifold may be equipped with a pressure transducer and a thermocouple. It is also possible to place some of the actuated components, such as the pintle actuator, on one or more separate, additional modules. Fuel and/or oxidizer flow may be controlled by regulating the delivery pressure and using on/off valves at the injector(s).

A thermocouple 29 configured to measure the temperature in the combustion chamber and a pressure transducer 28 to measure the pressure in the combustion chamber may be placed as shown in FIG. 3 or in other locations. A relief valve may be provided to protect the engine against overpressure. A thermocouple may be located in the wall at the throat of the nozzle to measure the exhaust temperature. An ignition source 21 such as an exciter coil or laser may be used for igniting the fuel oxidizer mixture inside the chamber. A source of ignition need not be present in all embodiments, for example in combustors using hypergolic fuels.

Figure 4:
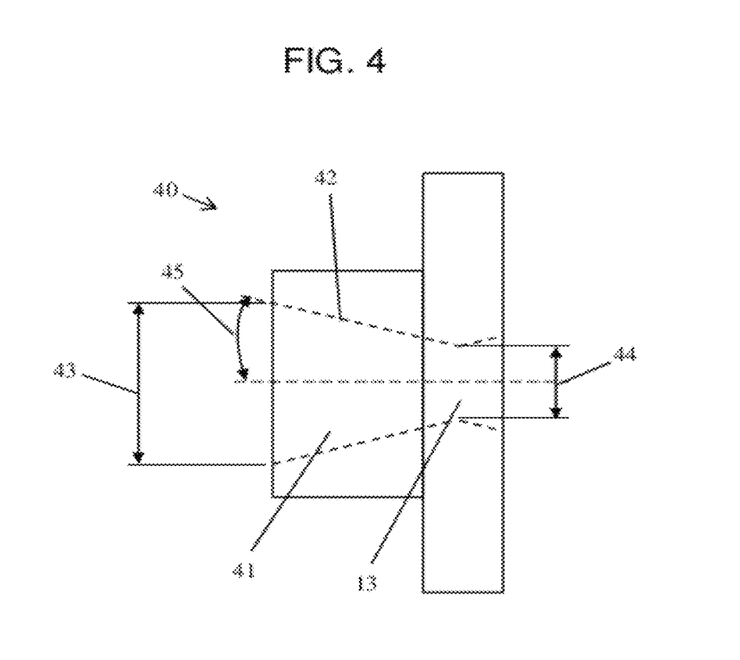
FIG. 4. is a drawing of a nozzle impact seal.

FIG. 4 shows an example of a nozzle impact seal 40 in detail. The seal comprises a conical nozzle throat 41 with a maximum inner diameter 43 and a minimum inner diameter 44 and comprising a throat seat surface 42 configured to receive and seal with a complementary conical portion 51 of the pintle head 16. The taper angle 45 of the throat matched taper angle 55 of the conical portion of pintle head 16 is most preferably about 15°, preferably between about 7° and about 30°, and possibly as high as about 45°. The nozzle throat narrows to the minimum diameter 44 to form the nozzle outlet 13, which may extend from the minimum diameter with an expanding opening as shown or as cylindrical channel as shown in FIG. 2.

Figure 5:
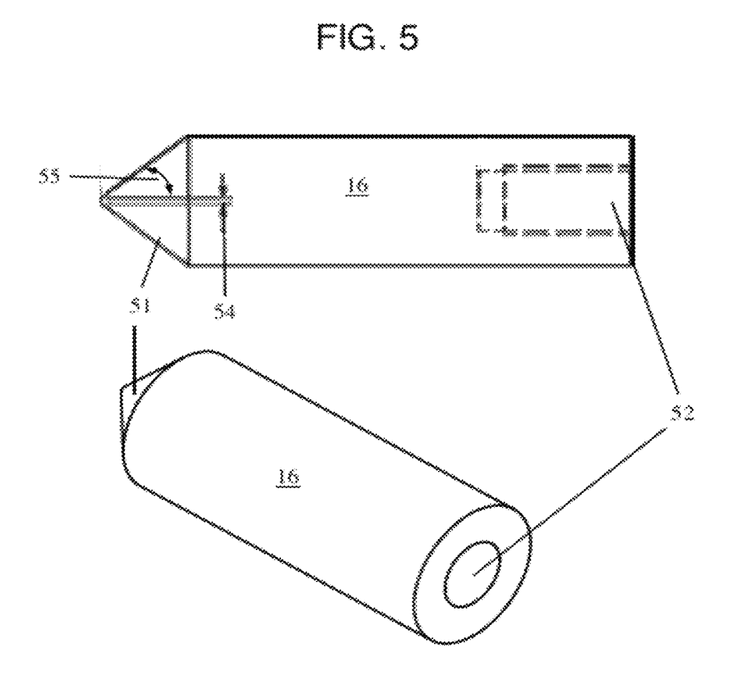
FIG. 5 shows cross-sectional and perspective views of a pintle head.
Figure 6:
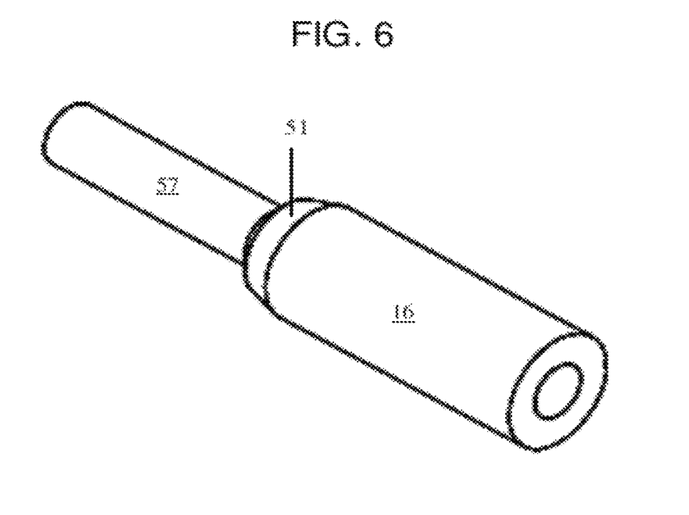
FIG. 6 shows a perspective view of a pintle head comprising an extension.

One embodiment of a pintle head is shown in FIG. 5. The pintle head comprises a sleeve 52 configured for attaching the pintle head 16 to a pintle shaft 18. The pintle shaft 18 and sleeve 52 may have any of a variety of cross-sectional shapes, including cylindrical, rectangular, hexagonal, and variable shapes. Separating the pintle into head and shaft portions 16 and 18 allows for the replacement of the head 16 alone without disconnecting the shaft 18 from its actuator 19. The pintle may, however, be embodied as a single piece including a head portion and a shaft portion. The pintle head comprises a conically shaped portion 51 having a minimum outer diameter 54 that is complementary to the conical throat 41 of the nozzle as shown in FIG. 4. The taper angle 45 of the nozzle throat 41 and angle 55 of the conical portion 51 of the pintle may be varied and is most preferable about 15°. FIG. 6 shows a pintle head 16 comprising a conical portion with an extension 57 that is configured to pass though the outlet nozzle 13 of the impact seal 40. The contact/sealing surfaces of the nozzle throat 41 and the conical portion 51 of the pintle head are preferably smooth but not polished, machined surfaces most preferably having a roughness of approximately 32 microinches preferably a roughness of 16 to 64 microinches, and possibly a wider roughness range.

The combinations of surface angles and surface roughnesses disclosed surprisingly provide an effective seal for the combustion chamber of the combustor with little or no pressure loss at over 1200 psi and with less ware of the sealing surfaces than expected. This unexpected discovery enables the CV combustion chamber to maintain a seal at higher pressures than prior CV combustion chambers.

Figure 7:
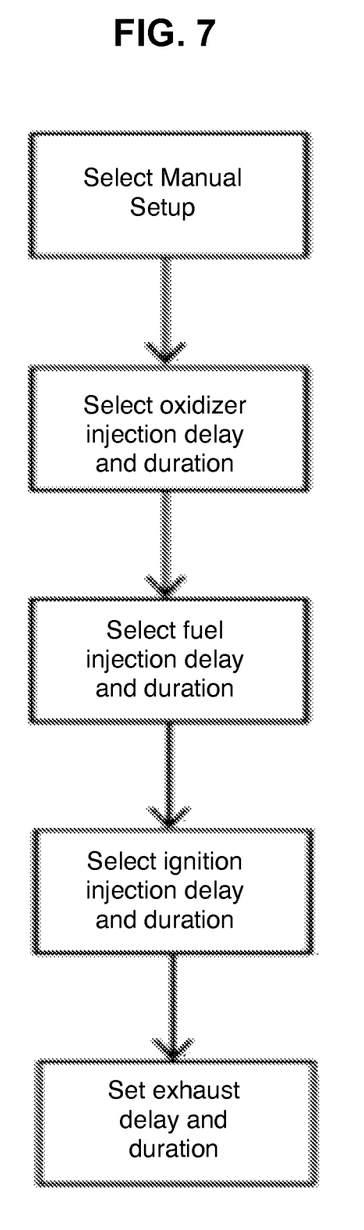
FIG. 7 is a flow chart of steps for manually setting operational parameters.

In a method for operating combustor according to the invention, the fuel and oxidizer propellants are injected into the closed-volume chamber by a fuel and oxidizer feed system at a low initial pressure and temperature. Operational parameters including propellant injection timing and duration, subsequent propellant mixing time, ignition timing, combustion time, and exhaust flow processes are selected and precisely controlled, preferably by an automated controller system and using feedback from pressure and temperature sensors arranged in the combustor. For example, a delay for propellant injection may be timed from the sealing of the chamber with the duration of the injection being coupled to known amount(s) of propellant(s) and/or a known pressure of propellant(s) in the chamber after injection. Delays for injection, ignition, and opening may be measured and set with reference to a zero time representing the earliest moment at which these may take place or with reference to a zero time in the cycle, such as the closing of the sealing of the combustion chamber. Delays and durations may also be measured from the end of the preceding step or any combination of these. An example of steps for setting operational parameters manually may include selecting manual setup 101, selecting oxidizer injection delay and duration 103, selecting fuel injection delay and duration 105, selecting ignition delay and duration 107, and setting seal opening, or exhaust, delay and duration 109 (FIG. 7). The combustor may be set to operate using these parameters or these parameters or a computer controller 30 may be used to automatically set operational parameters to achieve a desired result such as a desired thrust, or trajectory, or volume and/or pressure of combustion gas products released. Initial parameters may be set manually with the computer controller 30 modifying parameters over time in response to feedback from temperature and pressure measurements in the combustion chamber and/or exhaust nozzle.

The combustor may initially be in a state wherein the combustion chamber is sealed with no propellant in the volume of the combustion chamber 14. Propellants, for example a fuel and an oxidizer, are injected to the combustion chamber and either spontaneously ignite or are ignited with an ignition source such as a spark or a laser. It is also possible to use an energetic monopropellant that combusts when contacted with a catalyst located in the combustion chamber. The pintle head 16 remains in contact with the nozzle throat 41 to keep the combustion chamber sealed until a maximum or predetermined optimum pressure is reached in the combustion chamber 14. The pintle head 16 is then retracted from the nozzle throat 41 and high-temperature combustion products escape through the nozzle outlet 13 to produce a single impulse bit. After the volume of the combustion chamber 14 has been evacuated or a predetermined pressure is reached in the combustion chamber, the actuator 19 presses the pintle head 16 against the nozzle throat 41 of the impact seal 40 to seal the combustion chamber, making the combustor ready for the initiation of another cycle.

The controller for the system is preferably used to control operational parameters of the combustor including, but not limited to fuel and oxidizer injection durations, ignition delay, pintle open delay, pintle open duration, cycle delay, number of cycles, and fuel and oxidizer supply pressures. The controller may be housed, for example, on a computer with a touchscreen HMI panel. A manual screen may be used to enable the components to be activated manually. An auto screen may be used, for example, to run a test based on pre-set test control parameters, including setting test control parameters that determine the duration of each event (such as opening the oxidizer flow control valve) and the relative timing of each.

EXAMPLE

A combustor according to the embodiment shown in FIG. 3 was tested using propane and nitrous oxide as fuel and oxidizer propellants. Two tanks, one for each propellant, were connected to four paired oxidizer and fuel injectors through oxidizer and fuel manifolds and fuel and oxidizer valves. The pintle head and nozzle throat were constructed with a taper angle of 15 degrees and a roughness of 32 microinches. The travel distance of the pintle head was set to 0.25 inches. The computer readable controller code in this example was located in a separate computer control unit and controlled fuel supply, oxidizer supply, ignitor firing, and exhaust release and monitored cycle count and cycle completion, and temperature and pressure in the combustion chamber measured by temperature and pressure sensors. The combustor was manually set to produce sequential impulse bits using a variety of pressures, delays, and durations for propellant injection and exhaust release and cycle numbers and times. In this example, oxidizer and fuel delay times were set relative to the start of the cycle, fuel and oxidizer injection durations started from the end of injection delays, ignition delay was measured from end of the longest injection duration, and the start cycle was the end of the exhaust open duration. The sealed combustion chamber was able to maintain pressures of more than 1200 PSI. Cycling times were selected to range from 3 or more seconds to less than one second. The cycling times in other embodiments may be made shorter by providing faster actuation means and propellant valves.

Particular embodiments of the invention are described and illustrated in the drawings. Specific terminology is employed for the sake of clarity but the invention is not intended to be limited to the specific terminology used and it is to be understood that each specific element includes all technical equivalents that operate in a similar manner to accomplish a similar purpose. The terms used herein are intended to have their conventional meanings as understood by a person of ordinary skill in the art, as supplemented by the definitions provided.

The invention claimed is:

1. A constant volume combustion chamber comprising:
an inlet configured to receive a propellant and an outlet comprising a conically shaped nozzle throat and a nozzle outlet configured to allow combustion products to exit the constant volume combustion chamber;
a pintle head having a longitudinal axis and comprising a conical sealing portion configured to contact the conically shaped nozzle throat;
actuation means mechanically coupled to the pintle head and configured for moving said pintle head into and out of contact with the conically shaped nozzle throat;
a thermocouple configured to measure temperature in the constant volume combustion chamber; and
a pressure transducer configured to measure pressure in the constant volume combustion chamber
wherein:
the conically shaped nozzle throat comprises an inner throat seat surface configured to form a pressure tight seal when contacted with the conical sealing portion of the pintle head;
the conically shaped nozzle throat and conical sealing portion of the pintle head have diameters that taper from an internal volume of the constant volume combustion chamber toward the nozzle outlet with a taper angle of between 30° and 7°;
the conical sealing portion of the pintle head comprises a sealing surface configured to seal against the inner throat seat surface to seal the constant volume combustion chamber;
the actuation means configured to alternately move the pintle head so as to seal or open the constant volume combustion chamber; and
the roughness of the sealing surface of the pintle head and/or the inner throat seat surface is from 16 microinches to 64 microinches.

2. The constant volume combustion chamber of claim 1, and further comprising:
a fuel injector, an oxidizer injector, a fuel valve configured to control fuel flow into the constant volume combustion chamber, an oxidizer valve configured to control oxidizer flow into the constant volume combustion chamber, and means for igniting a mixture of fuel and oxidizer.

3. The constant volume combustion chamber of claim 2, and further comprising a computer controller coupled to the fuel injector, oxidizer injector, actuation means, and means for igniting a mixture of fuel and oxidizer.

4. The constant volume combustion chamber of claim 2, wherein the constant volume combustion chamber comprises an injector-pintle section, a combustion chamber section, and a nozzle section assembled to comprise said constant volume combustor wherein:
the injector-pintle section comprises: the fuel injector, the oxidizer injector, the fuel valve, the oxidizer valve, and the actuation means;
the combustion chamber section comprises walls enclosing a volume in which fuel and oxidizer mix and are combusted; and
the nozzle section comprises a replaceable impact seal comprising said conically shaped nozzle throat and a nozzle outlet.

5. The constant volume combustion chamber of claim 1, wherein the conically shaped nozzle throat and a distal nozzle outlet are embodied as a replaceable impact seal comprising said conically shaped nozzle throat and a nozzle outlet.

6. The constant volume combustion chamber of claim 1, wherein the actuation means is selected from the group consisting of pneumatic, electric, mechanical, and hydraulic means.

7. The constant volume combustion chamber of claim 1, wherein the pintle head comprises an extension that extends through the nozzle outlet.

8. The constant volume combustion chamber of claim 1, wherein the taper angle of the outlet matches the taper angle of the conical sealing portion of the pintle head.

9. A valve for controlling the flow of a fluid, said valve comprising:
   a chamber comprising a fluid inlet, a fluid outlet; and a pintle head mechanically coupled to an actuation means for moving said pintle head by a set travel distance into and out of contact with the fluid outlet wherein:
   said outlet comprises a conically-shaped throat having a maximum inner diameter and a minimum inner diameter and a taper angle,
   said pintle head comprises a conical portion configured to seal against said conically-shaped throat to close the fluid outlet,
   said actuation means configured to move the pintle head by the set travel distance to alternately seal against the conically-shaped throat such that the valve is closed and to separate from the conically-shaped throat by said set travel distance,
   the conically-shaped throat and conical portion of the pintle head have diameters that taper with a taper angle of between 30° and 7°, and
   the conically-shaped portion of the pintle head and the conically-shaped throat have surfaces with a roughness of between 16 microinches to 64 microinches.

10. The valve of claim 9, wherein the actuation means is selected from the group consisting of computer-controlled pneumatic, electric, mechanical, and hydraulic means, and is configured to open and close the valve.

11. The valve of claim 9, wherein said chamber is a combustion chamber, said fluid entering through the fluid inlet is an oxidizer and/or a fuel, and said fluid exiting through the fluid outlet comprises combustion products.

12. The valve of claim 9, wherein the taper angle of the fluid outlet matches the taper angle of the conical portion of the pintle head.

13. A valve for controlling the flow of a fluid, said valve comprising:
   a chamber comprising a fluid inlet, a fluid outlet; and a pintle head mechanically coupled to an actuation means for moving said pintle head by a set travel distance into and out of contact with the fluid outlet wherein:
   said outlet comprises a conically-shaped throat having a maximum inner diameter and a minimum inner diameter and a taper angle,
   said pintle head comprises a conical portion configured to seal against said conically-shaped throat to close the fluid outlet,
   said actuation means configured to move the pintle head by the set travel distance to alternately seal against the conically-shaped throat such that the valve is closed and to separate from the conically-shaped throat by said set travel distance,
   the conically-shaped throat and conical portion of the pintle head have diameters that taper with a taper angle of between 30° and 7°, and
   the taper angle of the fluid outlet matches the taper angle of the conical portion of the pintle head.

14. The valve of claim 13, wherein the actuation means is selected from the group consisting of computer-controlled pneumatic, electric, mechanical, and hydraulic means, and is configured to open and close the valve.

15. The valve of claim 13, wherein said chamber is a combustion chamber, said fluid entering through the fluid inlet is an oxidizer and/or a fuel, and said fluid exiting through the fluid outlet comprises combustion products.

\* \* \* \* \*